United States Patent Office 2,992,966
Patented July 18, 1961

2,992,966
PESTICIDE, PARTICULARLY AN INSECTICIDE
Ernst Jacobi and Siegmund Lust, Darmstadt, Albert van Schoor, Traisa, near Darmstadt, and Otto Zima, Darmstadt-Eberstadt, Germany, assignors to E. Merck, Aktiengesellschaft, Darmstadt, Darmstadt, Germany, a German corporation
No Drawing. Filed Nov. 13, 1953, Ser. No. 392,042
Claims priority, application Germany Nov. 21, 1952
3 Claims. (Cl. 167—30)

This invention relates to pesticides; and in particular is directed to novel insecticides. As is well known there are individual pests or species or genera or families or populations of pests or strains thereof, especially insects, that are more or less resistant to insecticides. Such resistance can be shown by experiments which demonstrate that higher doses of the toxic agent are required for the exterminations, or that the effect occurs only after a long period of time or not at all. In practice those species of insects that are of particular concern which have become relatively insensitive (resistant strains) to the frequently used modern contact insecticides in the series of highly chlorinated hydrocarbons, as for example dichlorodiphenyl-trichloroethane (DDT), hexachlorocyclohexane (referred to hereinafter as HCH) or Dieldrin.

It has been now been found that certain methylated derivatives of the phenyl ester of carbamic acid

are pesticides, especially insecticides which are highly effective against resistant insect strains, and which, therefore, can be used with great advantage together with the known highly chlorinated hydro-carbons acting as contact insecticides.

Accordingly, this invention is directed to a pesticide, particularly an insecticide, which contains, as the effective or active agent, either alone or together with other highly effective contact insecticides, the N-methyl-carbamic acid- and/or N,N-dimethyl-carbamic acid-phenyl ester; or one in which the phenyl radicals thereof contain 1 or 2 methyl groups, corresponding to the cresyl or xylenylesters. It has been found that the mixture of one of the aforementioned carbamic acid esters with HCH, particularly gamma-HCH, is particularly effective. The active components here in question are all methyl substitution products of phenyl carbamate which contain, on the nitrogen atom, one or two methyl groups, and, on the phenyl radical, from 0 to 2 methyl groups. They have the following general formula:

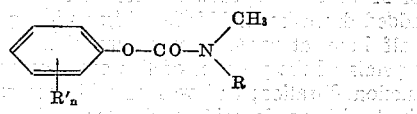

wherein:

R is H or $CH_3$,
R' is $CH_3$, and
n is 0 to 2.

The pesticides according to this invention can be used in all forms conventionally employed, as for instance, as sprays in aqueous emulsions, as mist by nozzling, a solution thereof in organic solvents and/or liquefied gases, as powders with or without a vehicle therefor, or as fumes. To manufacture the agent in a form ready for use, the conventional methods and additives (for instance, inert or active, solid or liquid, dustable, gasifiable, nozzleable materials or solvent, emulsifiers, wetting or binding agents, gases compressible to liquids, fume or mist developers, color imparting materials and odoriferous agents) can also be incorporated.

Of the aforesaid novel active agents, the N,N-dimethyl-carbamic acid phenyl ester and the corresponding crude cresyl ester are the only compounds previously known. A method of preparing these materials is set forth, for example, in German Patent 255,942. All the other active agents encompassed within the present invention were hitherto unknown. The most important physical constants (melting points or boiling points at 12 Torr) are assembled in the following table:

TABLE I

| Ester No. | Name | Melting Point, °C. | Boiling Point, 12 Torr., °C. |
|---|---|---|---|
| 1 | N,N-Dimethyl-carbamic acid-o-cresyl-ester. | | 135–137 |
| 2 | N,N-Dimethyl-carbamic acid-m-cresyl-ester. | | 138 |
| 3 | N,N-Dimethyl-carbamic acid-p-cresyl-ester. | 52–53 | |
| 4 | N,N-Dimethyl-carbamic acid-crude-cresyl-ester. | | 140–156 |
| 5 | N,N-Dimethyl-carbamic acid-3,4-xylenyl-ester. | 46–47 | |
| 6 | N,N-Dimethyl-carbamic acid-3,5-xylenyl-ester. | 43–45 | |
| 7 | N,N-Dimethyl-carbamic acid-2,5-xylenyl-ester. | | 142 |
| 8 | N-Methyl-carbamic acid-o-cresyl-ester. | 102–103 | |
| 9 | N-Methyl-carbamic acid-m-cresyl-ester. | 77–78 | |
| 10 | N-Methyl-carbamic acid-p-cresyl-ester. | 97 | |
| 11 | N-Methyl-carbamic acid-crude-cresyl-ester. | 38–48 | |
| 12 | N-Methyl-carbamic acid-3,4-xylen-yl-ester. | 81–82 | |
| 13 | N-Methyl-carbamic acid-3,5-xylen-yl-ester. | 102–103 | |
| 14 | N-Methyl-carbamic acid-2,5-xylen-yl-ester. | 74–76 | |
| 15 | N-Methyl-carbamic acid-phenyl-ester. | 86 | |
| 16 | N,N-Dimethyl-carbamic acid-phenyl-ester. | 44–46 | |

The active agents of this invention can be prepared, for example, in two stages. Thus, the first stage comprises reacting the phenolic component (phenol, cresol or xylenol) with 1 mole of phosgene (with the addition of 1 mole of alkali); and the second stage comprises condensing the product of stage 1 with the equivalent quantity of methylamine or dimethylamine (or a salt thereof plus alkali). The agents can be produced also by other known methods of preparing methyl substituted carbamic acid esters of phenols, as for instance, by the reaction of 1 mole of methyl- or dimethyl-urea chloride with 1 mol of phenol or cresol or xylenol in an inert solvent (preferably benzene) with the addition of an equivalent amount of alkali; or by the reaction of 1 mol of methyl isocyanate with 1 mol of phenol or cresol or xylenol. To manufacture the dimethyl carbamic acid ester there may also be reacted the chloroformic acid ester of phenol or cresol or xylenol with trimethylamine; and the quaternary salt thus produced subsequently split. The agents of this invention are characterized by particularly rapid activity, and the excellent efficiency thereof can be seen from the following tests on house-flies (*Musca domestica*). The stated quantities of the active agent (the code numbers of the tested esters refer to the corresponding numbers in preceding Table I of the physical constants) were applied in acetone solution to filter sheets having an area of 65 cm.², the solvent evaporated, and the filter paper was placed in a Petri dish. A substantial number of house-flies were inserted and the percentage of dead flies ascertained after contact exposure of three hours.

For comparison, the gamma-HCH was also tested.

TABLE II

| Substance | 10 mg. | 1 mg. | 0.1 mg. |
|---|---|---|---|
| | Percentage of Kill | | |
| gamma-HCH | 100 | 100 | 80 |
| Ester No. 1 | 100 | 70 | 20 |
| Ester No. 8 | 100 | 100 | 0 |
| Ester No. 9 | 100 | 100 | 0 |
| Ester No. 11 | 100 | 100 | 0 |
| Ester No. 15 | 100 | 100 | 0 |
| Ester No. 16 | 100 | 100 | 0 |

Extensive tests further showed that the active agents of this invention, in admixture with other agents, as for example, gamma-HCH, increased the killing of various types of insects and/or accelerated the killing. By such tests an increase in efficiency was distinctly demonstrated, an efficiency that was more than merely the additive effect of the individual components. As an example of such a test establishing synergistic activity, the lethal effects (in percent of the house-flies inserted in the testing compartment) is given in the following table of results which were obtained with gamma-HCH and the ester No. 1, supra, using each separately and in admixture with each other. The total amount of active agent employed in each test was 20 mg. The testing procedure was the same as that previously described. However, the success of killing was ascertained at different intervals, to wit, at the end of 30, 60 and 180 minutes, respectively.

TABLE III

| Dose per 65 cm.$^2$ | | Percent Mortality | | |
|---|---|---|---|---|
| Gamma-HCH, mg. | Ester No. 1, mg. | 30 min. | 60 min. | 180 min. |
| | 20 | 20 | 55 | 100 |
| 20 | | 35 | 85 | 100 |
| 5 | 15 | 65 | 95 | 100 |
| 10 | 10 | 65 | 95 | 100 |
| 15 | 5 | 65 | 100 | 100 |

Analogous comparative tests with the other above mentioned esters showed similar results. In the following table there are set forth the data of the tests with ester No. 15 (N-methyl-carbamic acid-phenyl ester) and ester No. 16 (N,N-dimethyl-carbamic acid-phenyl ester).

TABLE IV

| Dose per 65 cm.$^2$ | | Percent Mortality | | |
|---|---|---|---|---|
| Gamma-HCH, mg. | Ester No. 15, mg. | 30 min. | 60 min. | 180 min. |
| | 20 | 0 | 80 | 100 |
| 20 | | 15 | 60 | 90 |
| 5 | 15 | 40 | 100 | 100 |
| 10 | 10 | 40 | 100 | 100 |
| 15 | 5 | 30 | 100 | 100 |
| | 2.0 | 0 | 15 | 100 |
| 2.0 | | 0 | 55 | 80 |
| 0.5 | 1.5 | 10 | 80 | 100 |
| 1.0 | 1.0 | 20 | 60 | 100 |
| 1.5 | 0.5 | 10 | 80 | 100 |
| | [1]10 | 30 | | 100 |
| 10 | | 30 | | 90 |
| 10 | [1]1 | 70 | | 100 |
| 10 | [1]10 | 90 | | 100 |
| | [1]1 | 0 | | 90 |
| 1 | | 40 | | 80 |
| 1 | [1]0.1 | 50 | | 100 |
| 1 | [1]1 | 50 | | 100 |
| | [1]0.1 | 0 | | 0 |
| 0.1 | | 0 | | 30 |
| 0.1 | [1]0.01 | 0 | | 60 |
| 0.1 | [1]0.1 | 0 | | 50 |

[1] Ester No. 16.

The tests show that the esters Nos. 15 and 16 alone or in mixture with gamma-HCH are more effective than an equal quantity of gamma-HCH.

As examples of methods for manufacturing the active agents of this invention, the following are illustrative:

Example 1

N-METHYL-CARBAMIC ACID PHENYL ESTER 50 cc. of a 33 percent aqueous methylamine solution were added dropwise to 37.5 grams of phenylchloroformate, $ClCOOC_6H_5$, while being stirred at a temperature maintained at about 20° C. Subsequently, the stirring was continued for some time. The precipitated crystalline N-methyl-carbamic acid phenyl ester was separated by suction filtration, washed with water, and then crystallized from benzene-petroleum ether. It melted at 86° C. The yield was 31.5 grams (87 percent of the theoretical).

The N-methyl-carbamic acid phenyl ester is soluble in most organic solvents. It can be recrystallized from water or trichloroethylene. The melting point of the pure substance is 86° C. The melting point of 86° C., which is higher than the N,N-dimethyl ester (44°–46° C.), provides the advantage that when it is worked up in solid forms of application (for instance tablets, dusting agents) there are produced non-smearing products which can be stored for long periods of time and also at higher temperatures. This is a particularly important advantage for the manufacture of porducts containing admixtures of other insecticides. For instance, the mixture of equal parts of HCH and N,N-dimethylcarbamic acid phenyl ester has a melting point of 30° C., whereas, in contrast thereto, the mixture of HCH and N-methyl-carbamic acid phenyl ester has a melting point of 69° C.

Example 2

N,N-DIMETHYL-CARBAMIC ACID-o-CRESYL ESTER 7.5 kg. of chloroformic acid-o-cresyl ester are added dropwise while stirring into 26.5 kg. of a 12.5 percent benzene solution of trimethylamine at 20° C. The mixture is then boiled for three hours under reflux, after which it is filtered to remove any remaining small quantities of still undissolved components. The benzol is thereupon distilled off; and the residue is then distilled under vacuum. There are thus obtained 6.3 kg. of the N,N-dimethyl-carbamic acid-o-cresyl ester having a boiling point (at 12 mm.) of 135°–137° C.

Example 3

N-METHYL-CARBAMIC ACID-3,4-XYLENYL ESTER 92.2 grams of chloroformic acid-3,4-xylenyl ester are mixed with the aqueous solution of 33.7 grams of methylamine hydrochloride. While being well stirred, 95 cc. of 33 percent aqueous solution of sodium hydroxide are added dropwise at 20° C. After stirring for about one-half hour at room temperature, the crude precipitated crystals of the product of this example are separated by suction filtration; and washed with water; and recrystallized with acetic acid ethyl ester. The pure N-methyl-carbamic acid-3,4-xylenyl ester melts at 81°–82° C.

All the other carbamic acid esters mentioned in the table in column 2, lines 10–39 hereof can be produced without difficulty by methods similar to those described in the foregoing examples.

As examples of specific modes of application of the esters aforesaid in accordance with this invention for use as pesticides, the following are illustrative:

Example 4

A POWDER FOR USE AS A PESTICIDE FOR HUMAN BEINGS OR DOMESTIC ANIMALS 5 parts of N-methyl-carbamic acid-phenyl ester are rubbed with 95 parts of kaolin and 0.025 parts of lavender oil. 0.5 part of gamma-hexachlorocyclohexane or dichlorodiphenyltrichloroethane may be added.

Example 5
DUSTING POWDER FOR FORESTRY 1 part gamma-HCH and 15 parts of N-methylcarbamic acid raw cresyl ester are intimately mixed with 83 parts of talc and 1 part of colophony. This dusting powder can be sprayed by a motorized sprayer or from a plane upon the affected tree area.

Example 6
A SPRAY FOR ROOMS AND STABLES 5 parts of gamma-HCH and 10 parts of N,N-dimethyl-carbamic acid-phenyl ester are dissolved in 85 parts of methylene chloride. This solution can be nebulized by means of the conventional atomizers.

Example 7
A SPRAYING MEANS FOR AGRICULTURAL PURPOSES (WETTABLE POWDER)

An intimate mixture of 15 parts gamma-HCH, 30 parts of N,N-dimethyl-carbamic acid-o-cresyl ester, 5 parts of a powderized wetting agent, as for example sulfonated higher N-substituted unsaturated fatty acid amides and 50 parts of kieselguhr is prepared.

Example 8
A SPRAYING AGENT FOR AGRICULTURAL PURPOSES (EMULSION)

5 parts of gamma-HCH, 30 parts of N-methylcarbamic acid-raw cresyl ester and 35 parts of Emulgator EF (Chem. Werke Hüls) are dissolved in 29 parts of tetrahydrofuran. The Emulgators, herein referred to, are oleic acid polyglycol esters and are readily available in the market.

The last described agents for agricultural purposes are applied to plant cultures affected by pestiferous insects by means of portable or wheeled spraying devices.

Instead of Emulgator EF (Chem. Werke Hüls) any good emulgator of the type of polyoxyethylene condensation product with fatty acid glycerolesters can be used.

The pesticides of this invention comprise a plurality of the individual methyl-substituted phenyl carbamates having the general formula set forth in column 1, lines 50–58, supra, and also such plurality of individual compounds and a highly chlorinated hydrocarbon contact insecticide.

It will be understood that the foregoing description of the invention and the various embodiments thereof set forth are merely illustrative of the principles thereof. Accordingly, the appended claims are to be construed as defining the invention within the full spirit and scope thereof.

We claim:

1. Method of combating insects which comprises subjecting the insects to the action of N-methylcarbamic acid phenyl ester.

2. A method of combating insects which comprises subjecting the insects to an action of a composition containing N-methylcarbamic acid phenyl ester.

3. The method of killing insects which comprises distributing a composition containing a pesticidal carrier and N-dimethyl, phenyl-carbamate to bring said composition into contact with the insects.

References Cited in the file of this patent
UNITED STATES PATENTS

| | | |
|---|---|---|
| 1,074,966 | Merling et al. | Oct. 7, 1913 |
| 2,592,890 | Basle | Apr. 15, 1952 |
| 2,677,698 | Deutschman et al. | May 4, 1954 |

OTHER REFERENCES

Brown: Insect Control by Chemicals, 1951 p. 8.
Journal of the South African Chemical Institute, Vol. 2, No. 3, pp. 131–134 (1949).